(12) United States Patent
Tsuyama

(10) Patent No.: US 6,902,438 B2
(45) Date of Patent: Jun. 7, 2005

(54) CONNECTOR

(75) Inventor: Osamu Tsuyama, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 17 days.

(21) Appl. No.: 10/200,037

(22) Filed: Jul. 22, 2002

(65) Prior Publication Data

US 2003/0017724 A1 Jan. 23, 2003

(30) Foreign Application Priority Data

Jul. 23, 2001 (JP) .................................. 2001-222236
Jul. 23, 2001 (JP) .................................. 2001-222237

(51) Int. Cl.[7] .............................................. H01R 13/04
(52) U.S. Cl. .................. 439/694; 439/281; 439/746; 439/881; 439/942; 439/953
(58) Field of Search .................... 439/394, 466, 439/468, 281, 273, 352, 953, 383, 694, 746, 881, 853

(56) References Cited

U.S. PATENT DOCUMENTS

| | | | | |
|---|---|---|---|---|
| 1,794,777 A | * | 3/1931 | Kliegl | 439/353 |
| 1,978,076 A | * | 10/1934 | Cassedy, Jr. | 439/690 |
| 2,906,986 A | * | 9/1959 | Schaefer | 439/281 |
| 3,636,495 A | * | 1/1972 | Forsyth, Jr. | 439/106 |
| 5,724,200 A | | 3/1998 | Mochizuki | |

* cited by examiner

Primary Examiner—Neil Abrams
Assistant Examiner—Phuong Dinh
(74) Attorney, Agent, or Firm—Foley & Lardner LLP

(57) ABSTRACT

A root portion of the terminal connecting section of one of the male terminals that projects outward is provided with a fitting section to be fitted into a female holder. The fitting section of the male holder is fitted into the insertion hole of the female holder.

16 Claims, 16 Drawing Sheets

FIG.3A
FIG.3B
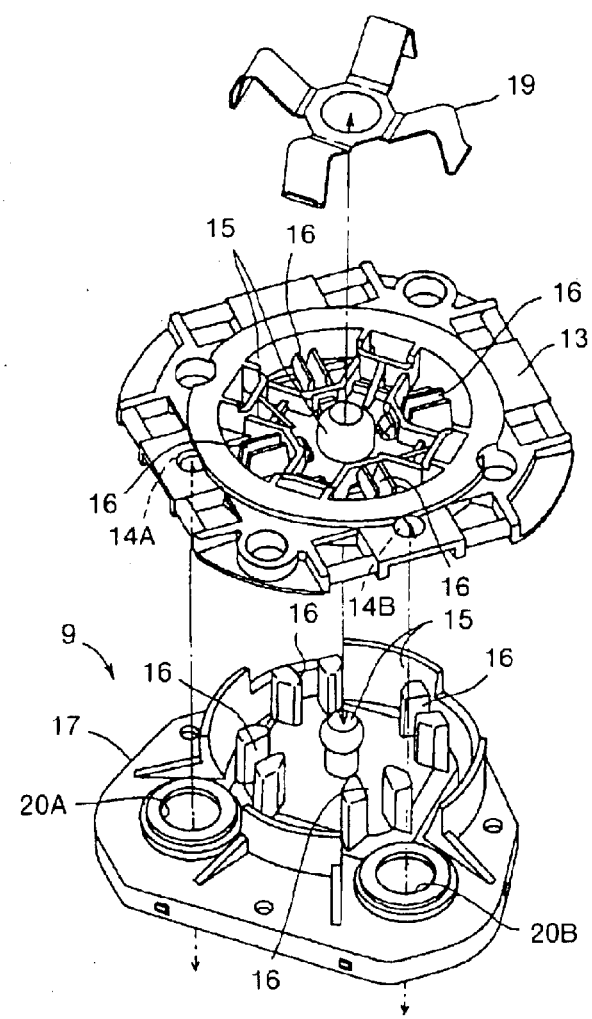
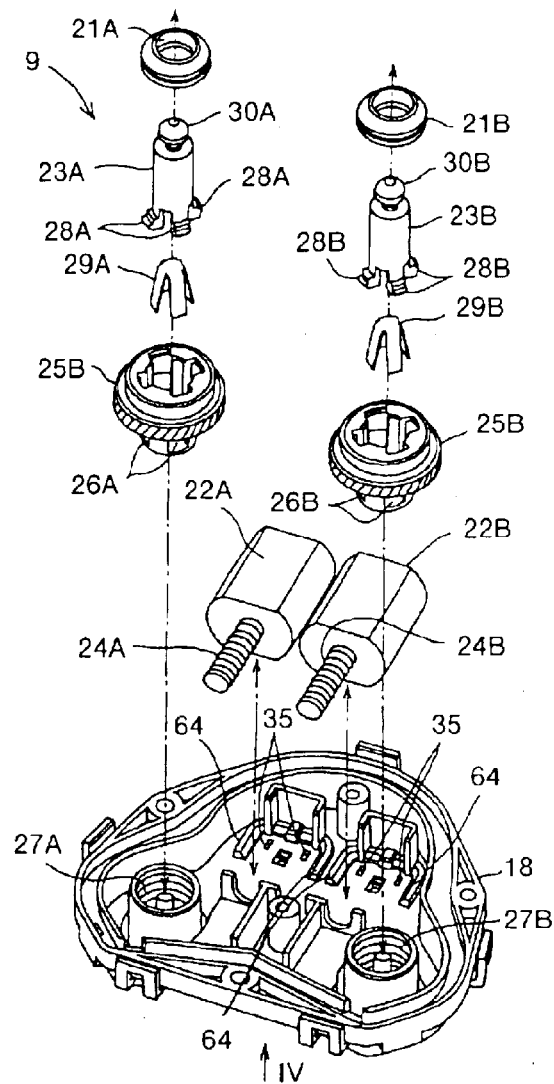

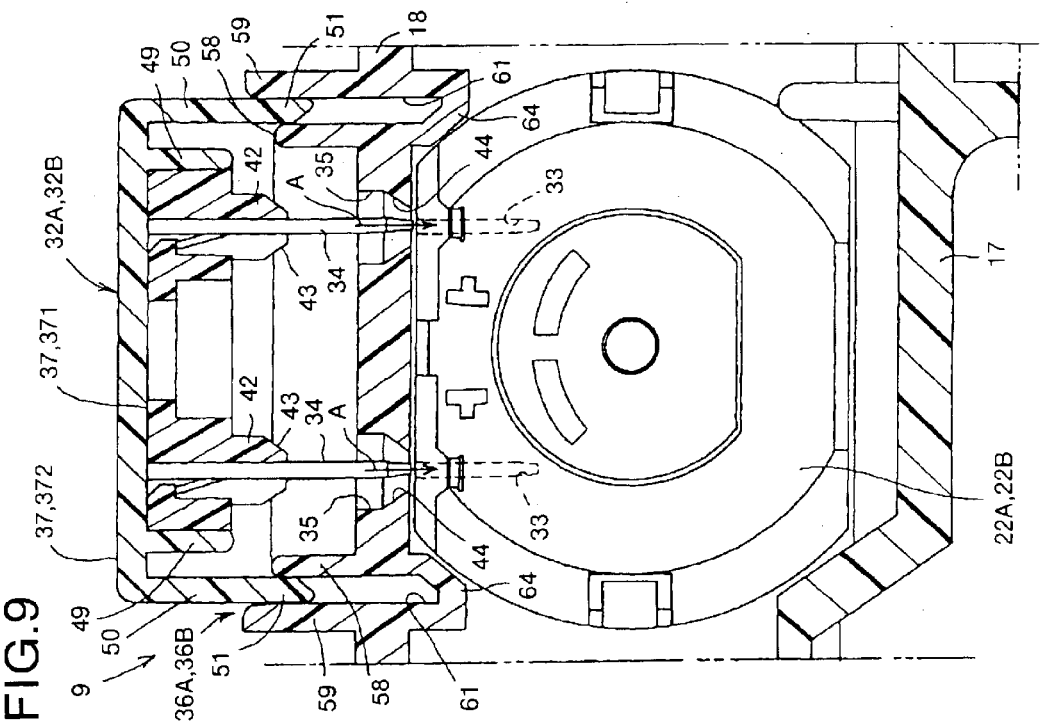
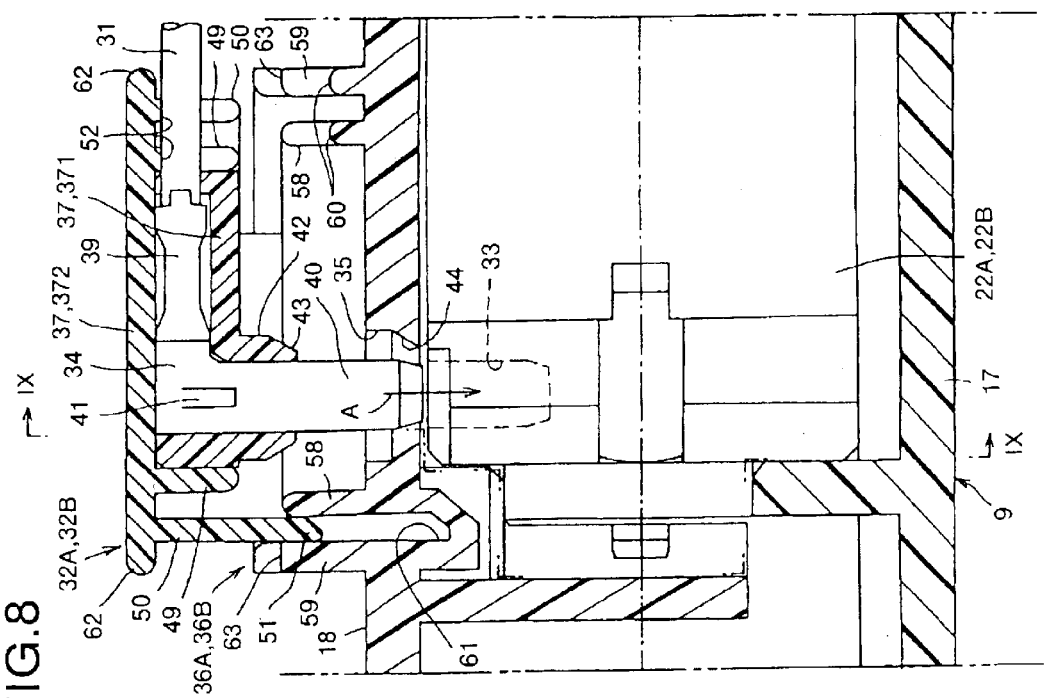

CONNECTOR

BACKGROUND OF THE INVENTION

1) Field of the Invention

The present invention relates to a connector used for connecting electric conductors to each other, e.g., harnesses to each other, a harness and an electrical apparatus to each other, or a harness and a printed circuit board.

2) Description of the Related Art

A conventional connector has been disclosed in U.S. Pat. No. 5,724,200. This connector is used for connecting a harness of a power supply and a power unit of a remote control type mirror apparatus of an automobile.

It is important that this connector has excellent waterproofing effect and dustproofing effect, and that the connector can reliably establish electric connection.

SUMMARY OF THE INVENTION

It is an object of the present invention to provide a connector having excellent waterproofing effect and dustproofing effect, and capable of reliably establishing electric connection.

In the connector according to one aspect of the present invention, a root portion between a terminal connecting section and a male terminal projecting from outside out of male holders is provided with a fitting section which is fitted into an insertion hole of a female holder.

As a result, a portion of the female holder located in the insertion hole from the root of the male holder among the terminal connecting section of the male terminal projecting outward of the male holder is covered with the fitting section. With this, a portion of the terminal connecting section of the male terminal that is exposed outside is extremely small as compared with a conventional connector and thus, water and duct are less prone to be attached. Therefore, it is extremely rare that water or dust attached to the exposed portion of the male terminal enters a connecting portion between the male terminal and female terminal, which is electrically preferable. The connector of this invention has excellent waterproofing effect and dustproofing effect.

Accordingly, the fitting section of the male holder is fitted into the insertion hole of the female holder. Therefore, the male terminal can be reliably inserted into the female terminal without rattle by the fitting between the fitting section and the insertion hole. Thus, the male terminal and the female terminal are electrically connected to each other reliably.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3A is an exploded perspective view of, a spring, a mirror holder base and a first housing of a power unit of a remote control mirror apparatus for automobile, FIG. 3B is an exploded perspective view of the power unit of the remote control mirror apparatus for automobile, FIG. 8 is a sectional view of a state before the female connector and the male connector are connected to each other taken along a line VI—VI in FIG. 5, FIG. 9 is a sectional view taken along a line IX—IX in FIG. 8.

DETAILED DESCRIPTIONS

Embodiment(s) of the connector of the present invention will be explained with reference to the accompanying drawings below. The connector in the present embodiment is used for connecting a power unit of a remote control mirror apparatus for automobile and a harness on the side of a power supply. The invention is not limited to this embodiment.

In the embodiment, expressions "laterally" and "lateral direction" means "laterally" and "lateral direction" around a vertical axis in a state in which the remote control mirror apparatus for automobile is mounted to an automobile. Further, "vertically" and "vertical direction" means "vertically" and "vertical direction" around a horizontal axis in the state in which the remote control mirror apparatus for automobile is mounted to the automobile.

The remote control mirror apparatus for automobile will be explained with reference to FIGS. 1, 2, 3A and 3B.

Figure 1:
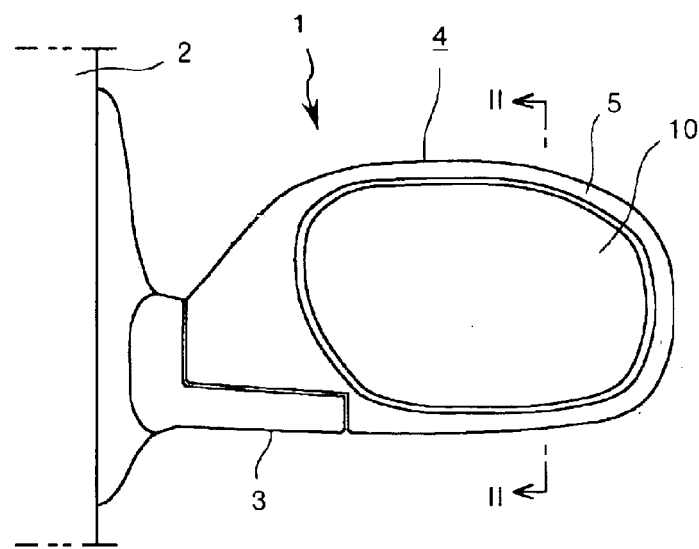
FIG. 1 shows a using state showing an embodiment of a connector of this invention, and is a perspective view of a door mirror apparatus using the connector of this embodiment.
Figure 2:
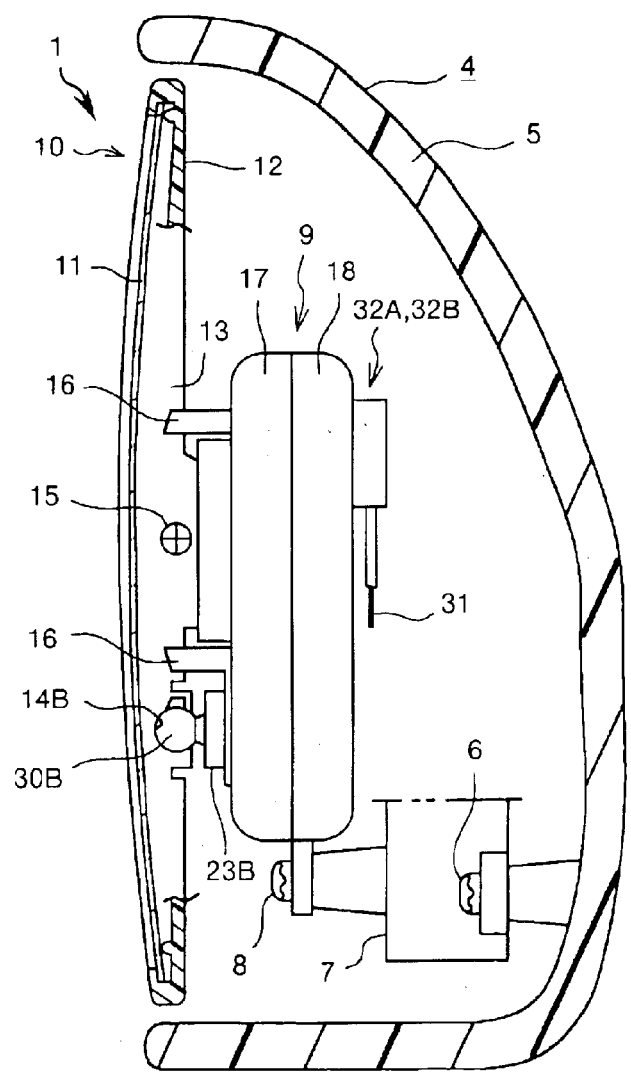
FIG. 2 is a sectional view taken along a line II—II in FIG. 1.

The remote control mirror apparatus for automobile shown in FIGS. 1 and 2 is a so-called door mirror apparatus 1. The door mirror apparatus 1 comprises a base 3 fixed to a door 2 of the automobile, and a mirror assembly 4 tiltably mounted to the base 3. As the remote control mirror apparatus for automobile, there also exist a fender mirror apparatus and a rearview mirror apparatus other than the door mirror apparatus 1.

As shown in FIG. 2, the mirror assembly 4 comprises a mirror housing 5, a unit bracket 7 mounted to the mirror housing 5 by a screw 6 or the like, a power unit 9 mounted to the unit bracket 7 by a screw 8, and a mirror unit 10 tiltably mounted to the power unit 9.

As shown in FIG. 2, the mirror unit 10 comprises a mirror body 11, a mirror holder 12 for holding the mirror body 11, and a mirror holder base 13 assembled to a central portion of the mirror holder 12.

As shown in FIG. 3A, the mirror holder base 13 is provided with a lateral ball recess 14A, a vertical ball recess 14B, a pivot mechanism 15 and a guide mechanism 16. The mirror holder 12 and the mirror holder base 13 are separate structures, and the mirror holder base 13 is integrally assembled to the central portion of the mirror holder 12. In this invention, the mirror holder 12 and the mirror holder base 13 may be formed as an integral structure.

On the other hand, as shown in FIGS. 2, 3A and 3B, the power unit 9 includes a first housing 17 and a second housing 18. The first housing 17 is provided with a pivot mechanism 15 and a guide mechanism 16. The mirror holder base 13 is tiltably mounted to the first housing 17 of the power unit 9 through a spring 19, the pivot mechanism 15 and the guide mechanism 16. The spring 19 may be a cross-shaped integral structure or may comprise two straight bars combined to form a cross shape.

The first housing 17 is provided with circular lateral opening 20A and vertical opening 20B. Circular lateral packing 21A and vertical packing 21B are respectively mounted to edges of the lateral opening 20A and vertical opening 20B.

A lateral motor 22A and a vertical motor 22B are embedded in the first housing 17 and the second housing 18, respectively. A lateral advancing/retreating mechanism 23A and a vertical advancing/retreating mechanism 23B are connected to the lateral motor 22A and the vertical motor 22B through a deceleration mechanism and an advancing/retreating mechanism. The lateral advancing/retreating mechanism 23A and the vertical advancing/retreating mechanism 23B are provided such that they can rotate, advance and retreat with respect to the first housing 17 and the second housing 18, and are held watertightly by the lateral packing 21A and the vertical packing 21B.

The deceleration mechanism comprises a lateral worm 24A and a vertical worm 24B mounted to rotation shafts of the lateral motor 22A and the vertical motor 22B, and a lateral helical gear 25A and a vertical helical gear 25B meshing with the lateral worm 24A and the vertical worm 24B. The lateral helical gear 25A and the vertical helical gear 25B are mounted to the first housing 17 and the second housing 18 such that they can rotate but can not move in the advancing/retreating direction of the lateral advancing/retreating mechanism 23A and the vertical advancing/retreating mechanism 23B. The lateral helical gear 25A and the vertical helical gear 25B are hollow structures. The lateral advancing/retreating mechanism 23A and the vertical advancing/retreating mechanism 23B are respectively disposed in the hollow portions of the lateral helical gear 25A and the vertical helical gear 25B. The lateral helical gear 25A and the vertical helical gear 25B are respectively provided with a plurality of (four in this example) lateral through holes 26A and vertical through holes 26B.

The advancing/retreating mechanism comprises a lateral female screw 27A and a vertical female screw 27B provided on the second housing 18, a lateral resilient engaging pawl 28A and a vertical resilient engaging pawl 28B of male screws provided on base ends of the lateral advancing/retreating mechanism 23A and the vertical advancing/retreating mechanism 23B, and a lateral spring 29A and a vertical spring 29B. The lateral resilient engaging pawl 28A and the vertical resilient engaging pawl 28B pass through the lateral through hole 26A and the vertical through hole 26B by their own actions and spring actions of the lateral spring 29A and the vertical spring 29B, and always resiliently engage with the lateral female screw 27A and the vertical female screw 27B. The lateral resilient engaging pawl 28A and the vertical resilient engaging pawl 28B abut against edges of the lateral through hole 26A and the vertical through hole 26B and with this abutment, the lateral advancing/retreating mechanism 23A and the vertical advancing/retreating mechanism 23B, as well as the lateral helical gear 25A and the vertical helical gear 25B are rotated synchronously.

Tip ends of the lateral advancing/retreating mechanism 23A and the vertical advancing/retreating mechanism 23B are integrally provided with a lateral ball section 30A and a vertical ball section 30B, respectively. The lateral ball section 30A of the lateral advancing/retreating mechanism 23A and the vertical ball section 30B of the vertical advancing/retreating mechanism 23B are respectively fitted into the lateral ball recess 14A and the vertical ball recess 14B of the mirror holder base 13. With this, the mirror unit 10 is tiltably mounted to the power unit 9 in both lateral direction and vertical direction.

The power unit 9 and the harness 31 are electrically connected to each other through the connector of this embodiment, and it is possible to feed electricity to the lateral motor 22A and the vertical motor 22B. Electricity is fed to the lateral motor 22A or the vertical motor 22B by remote control from a driver's seat in the automobile. Then, the lateral motor 22A is driven, the lateral advancing/retreating mechanism 23A is advanced or retreated, and the mirror unit 10 is tilted laterally around a vertical axis (not shown) passing through a center of the pivot mechanism 15 with respect to the power unit 9 through the mirror holder base 13. Alternatively, the vertical motor 22B is driven, the vertical advancing/retreating mechanism 23B is advanced or retreated, and the mirror unit 10 is tilted vertically around a horizontal axis (not shown) passing through a center of the pivot mechanism 15 with respect to the power unit 9 through the mirror holder base 13.

The connector in this embodiment will be explained with reference to FIGS. 4 to 28.

As shown in FIG. 2, the connector in this embodiment includes a female connector, two male connectors 32A and 32B. By connecting the female connector and the two male connectors 32A and 32B, the power unit 9 and the harness 31 on the power supply side of the remote control mirror apparatus for automobile are electrically connected to each other.

The female connector will be explained below. The female connector is the power unit 9 of the remote control mirror apparatus for automobile in this example. As shown in FIGS. 6 to 9, the female connector (power unit 9) comprises two female terminals 33 respectively embedded in the lateral motor 22A and the vertical motor 22B, and the first housing 17 and the second housing 18 as insulative female holders holding four female terminals 33.

Each the female terminal 33 comprises an electrical apparatus connecting section (not shown) connected to the lateral motor 22A and the vertical motor 22B as the electrical apparatus, and a terminal connecting section (not shown) to which the male terminals 34 of the male connectors 32A and 32B are connected.

Figure 4:
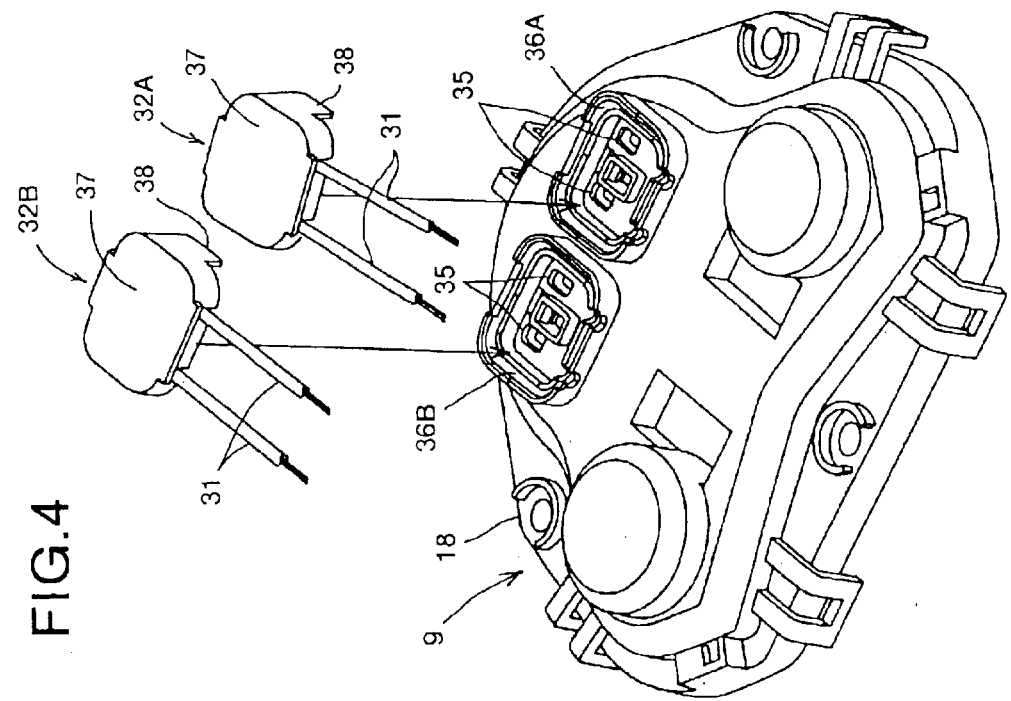
FIG. 4 is an exploded perspective view of a female connector (power unit) and a male connector taken along an arrow IV in FIG. 3B.

As shown in FIG. 4, the second housing 18 as the female holder is provided with four insertion holes 35 in correspondence with the four female terminals 33. The second housing 18 is provided with a lateral fitting section 36A and a vertical fitting section 36B such as to surround the two insertion holes 35.

The male connectors 32A and 32B will be explained. As shown in FIGS. 4 to 9, each of the lateral male connector 32A and the vertical male connector 32B comprises two male terminals 34 and an insulative male holder 37 holding the two male terminals 34. The male holders 37 are provided with first fitting sections 38 fitted to the lateral fitting section 36A and the vertical fitting section 36B of the female holder (second housing 18).

Figure 26C:
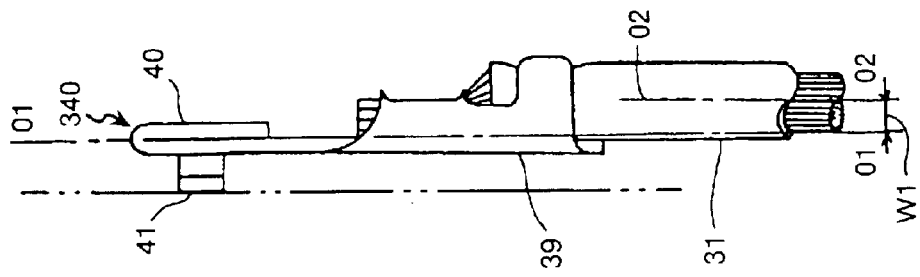
FIG. 26C is a front view of the male terminal having no crank section.
Figure 26B:
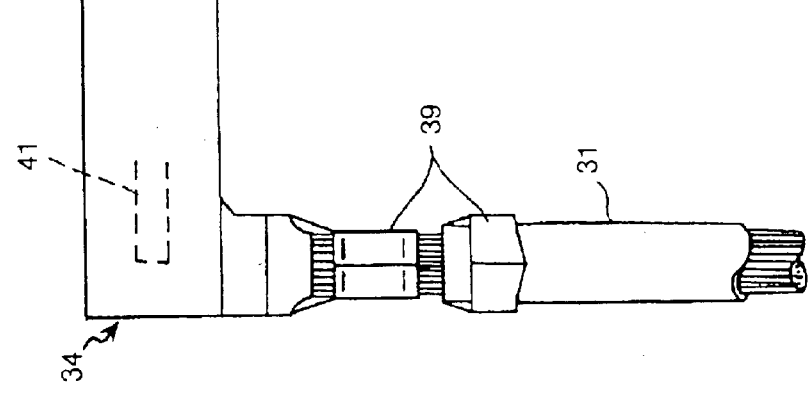
FIG. 26B is a perspective view taken along an arrow B in FIG. 26A.
Figure 26A:
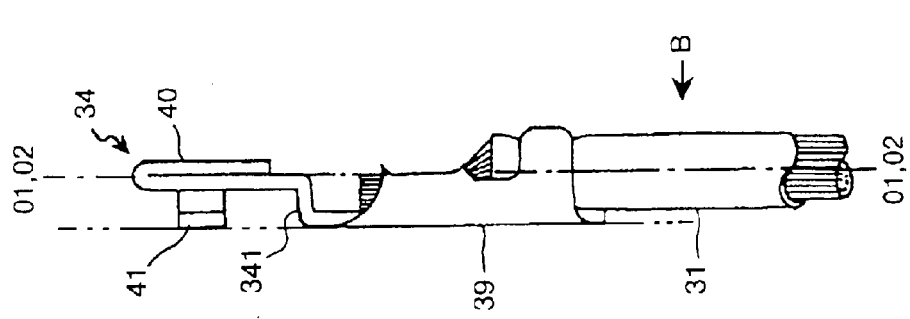
FIG. 26A is a front view of the male terminal.

As shown in FIGS. 26A and 26B, each of the two male terminals 34 comprises a harness connecting section 39 to which the harness 31 is connected, and a terminal connecting section 40 which projects outward from the male holder 37 and is connected to the female terminal 33. The harness connecting section 39 and the terminal connecting section 40 are bent substantially at right angle. A portion of the terminal connecting section 40 is cut such as to rise therefrom to form a falling-out preventing section 41. This falling-out preventing section 41 prevents the male terminal 34 from falling out from the male holder 37.

In the male terminal 34, a crank section 341 is provided between the harness connecting section 39 and the terminal connecting section 40. With this crank section 341, a center axis 02—02 of the harness connecting section 39 and a center axis 01—01 of the terminal connecting section 40 substantially coincide with each other and thus, a back surface of the harness connecting section 39 and a back surface of the falling-out preventing section 41 become substantially flush with each other.

As shown in FIGS. 6 to 9, a root portion of the male terminal 34 with respect to the terminal connecting section 40 out of the male holders 37 is integrally provided with a second fitting section 42 which is fitted into the insertion hole 35.

A lower outer surface of the second fitting section 42 and a lower inner surface of the insertion hole 35 are respectively formed with tapered surfaces 43 and 44. A width of each of the tapered surfaces is reduced in a direction in which the terminal connecting section 40 of the male terminal 34 is inserted into the insertion hole 35 and inserted into the female terminal 33, i.e., in an insertion direction (direction of arrow in the drawing).

The insertion hole 35 has such a size that the second fitting section 42 can be fitted thereinto. The insertion hole 35 also function as an insertion hole into which a test terminal (not shown) for carrying out a test of an electrical apparatus (lateral opening 22A, vertical opening 22B) on the side of the female connector (power unit 9).

The male holder 37 comprises separate connector holder 371 and connector cover 372.

As shown in FIGS. 12 to 21, 24 and 25, the connector holder 371 is of a base structure. The connector holder 371 is provided with two temporarily holding through holes 45. The connector holder 371 is provided with two temporarily holding recesses 46 in a state in which the temporarily holding recesses 46 cross the temporarily holding through holes 45 substantially at right angles. An inner surface of the temporarily holding through hole 45 is provided with a falling-out preventing step 47. Central portions of opposite sides of the connector holder 371 are provided with third fitting sections 48 which are fitted to the connector covers 372.

As shown in FIGS. 12 to 19 and 22 to 25, the connector cover 372 is of a cover structure for covering the connector holder 371. That is, one surface (lower surface) of the connector cover 372 is opened and the other surface (upper surface) thereof is closed, and the connector cover 372 comprises double rising walls, i.e., an inner rising wall 49 and an outer rising wall 50.

A height of the inner rising wall 49 is substantially the same as that of a portion of the outer rising wall 50. A height of other portion (U-shaped) of the outer rising wall 50 is higher than the inner rising wall 49 and a portion of the outer rising wall 50. The higher portion of the outer rising wall 50 also functions as a guide projection 51 which is a guide unit.

The outer rising wall 50 also functions as the first fitting section 38 which is fitted to the lateral fitting section 36A and vertical fitting section 36B of the female holder (second housing 18). Each of the rising walls 49 and 50 is provided with a notch 52 for pulling out the harness 31. A lance-like resilient fitting section 53 is provided on each of central portions of opposite sides of the inner rising wall 49 as a fitting section which is fitted to a third fitting section 48 of the connector holder 37.

As shown in FIGS. 12 to 15, the terminal connecting section 40 of the male terminal 34 is inserted into the temporarily holding through hole 45 of the connector holder 371 in an inserting direction A, and a portion of the terminal connecting section 40 of the male terminal 34 is projected outward from the temporarily holding through hole 45 of the connector holder 371. The falling-out preventing section 41 of the male terminal 34 is allowed to abut against the falling-out preventing step 47 of the connector holder 371. At the same time, the harness connecting section 39 of the male terminal 34 and the harness 31 are accommodated in the temporarily holding recess 46 of the connector holder 371. As a result, the male terminal 34 is temporarily held by the connector holder 371 in a state in which a portion of the terminal connecting section 40 of the male terminal 34 is projected outward from the connector holder 371.

As shown in FIGS. 14 to 19, the connector cover 372 is fitted into the connector holder 371 which temporarily holds the male terminal 34 in the inserting direction A to cover the connector cover 372. That is, the connector holder 371 and the male terminal 34 are accommodated in the inner rising wall 49 of the connector cover 372. The harness 31 is pulled out from the male holder 37 from the notch 52 of the connector cover 372. Further, the resilient fitting section 53 of the connector cover 372 is resiliently fitted to the third fitting section 48 of the connector holder 371. At that time, the third fitting section 48 and the resilient fitting section 53 are bent as shown with the arrow in FIG. 18. As a result, the male terminal 34 is finally held by the connector holder 371 and the connector cover 372 (male holder 37) in a state in which a portion of the terminal connecting section 40 of the male terminal 34 is projected outward from the connector holder 371.

Figure 27A:
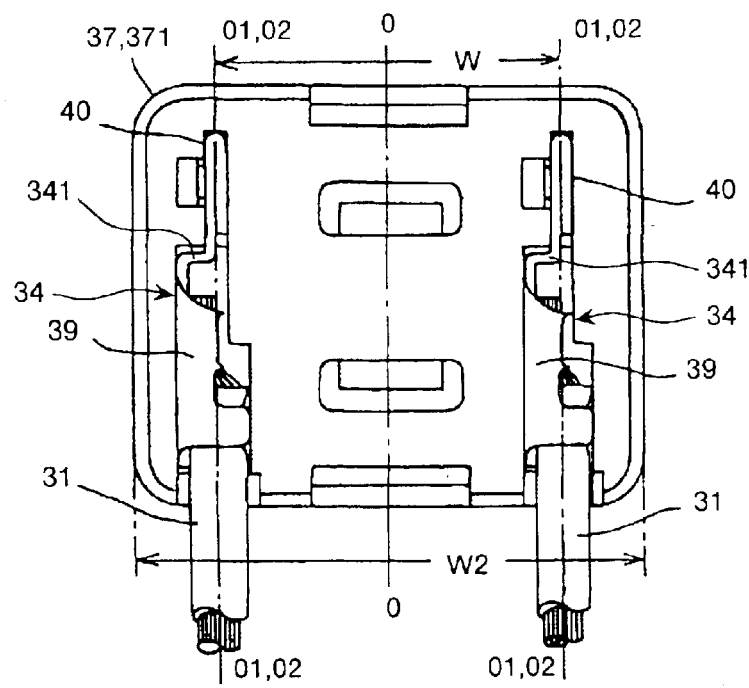
FIG. 27A is a rear view of a state in which the male terminal is temporarily held by the connector holder taken along an arrow XXVII in FIG. 5.

As shown in FIG. 27A, an outward appearance of the male holder 37 holding the two male terminals 34 is symmetric with respect to a center axis 0—0 for waterproofing the connector. A distance W between center axes 01—01 of the terminal connecting sections 40 of the two male terminals 34 is set to a predetermined size. The center axes 01—01 of the terminal connecting sections 40 of the two male terminals 34 is disposed symmetrically with respect to the center axis 0—0 of the male holder 37.

A lock mechanism for detachably locking the male holder 37 and the female holder (second housing 18) is provided on a central portion of the male holder 37 and a central portion of the female holder (second housing 18).

Figure 5:
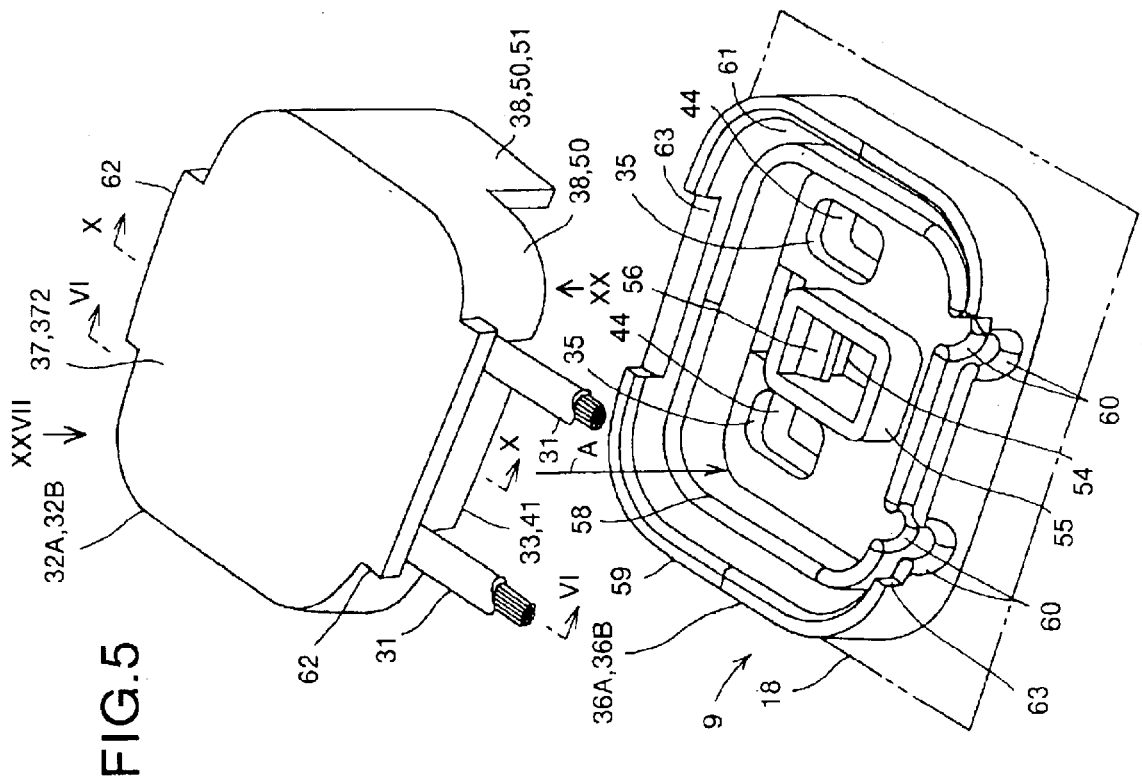
FIG. 5 is an exploded perspective view in which a portion of FIG. 4 is enlarged.
Figure 10:
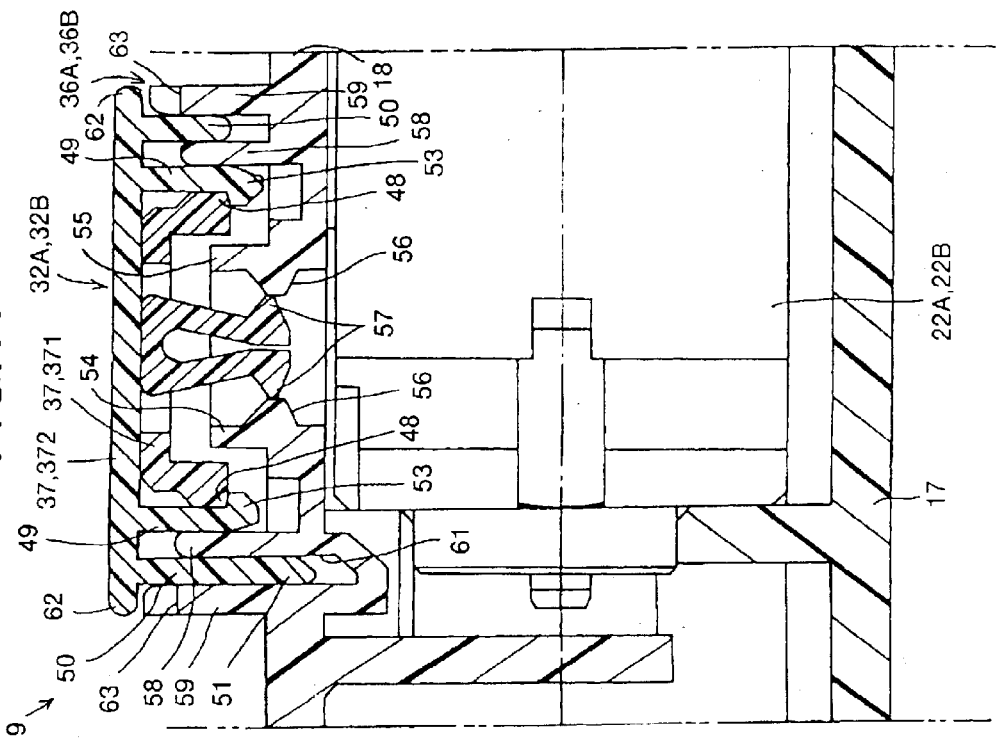
FIG. 10 is a sectional view of a state in which the female connector and the male connector are connected to each other taken along a line X—X in FIG. 5.
Figure 11:
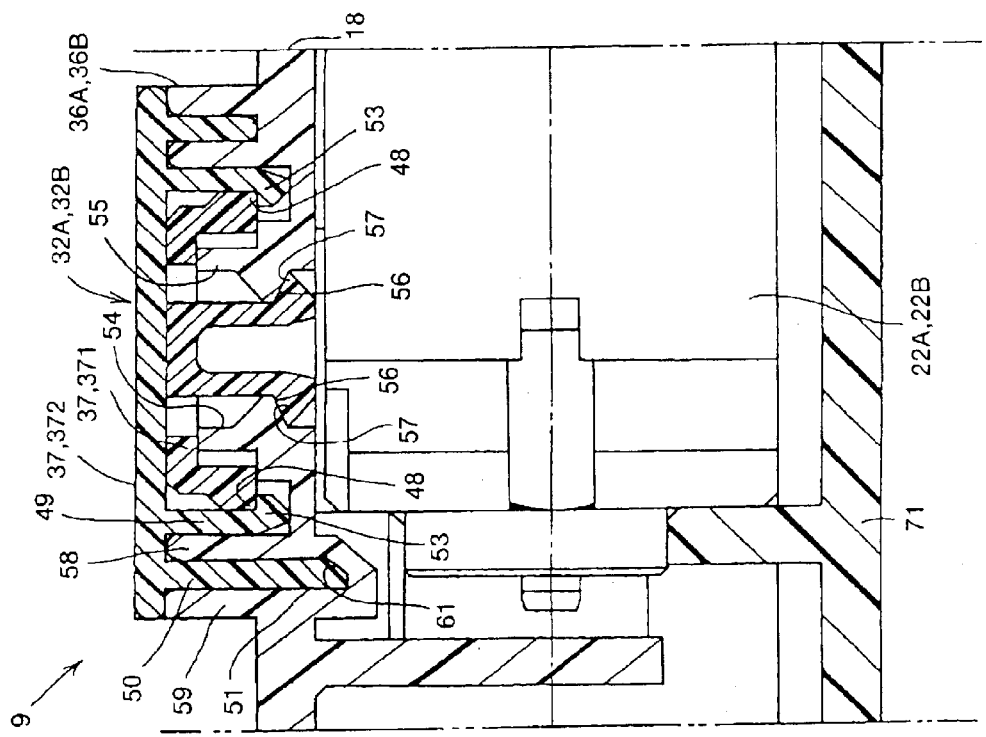
FIG. 11 is a sectional view of a state before the female connector and the male connector are connected to each other taken along a line X—X in FIG. 5.
Figure 12:
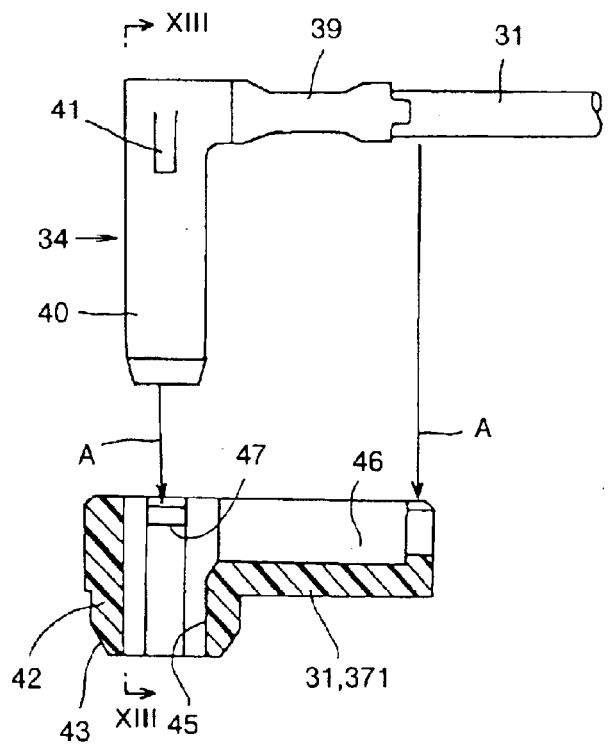
FIG. 12 is a sectional view of a state before the male terminal is temporarily held by a connector holder taken along a line VI—VI in FIG. 5.
Figure 13:
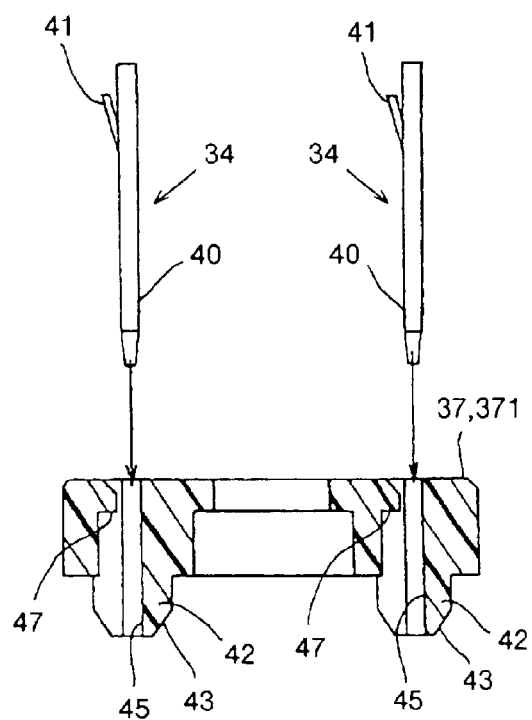
FIG. 13 is a sectional view taken along a line XIII—XIII in FIG. 12.
Figure 14:
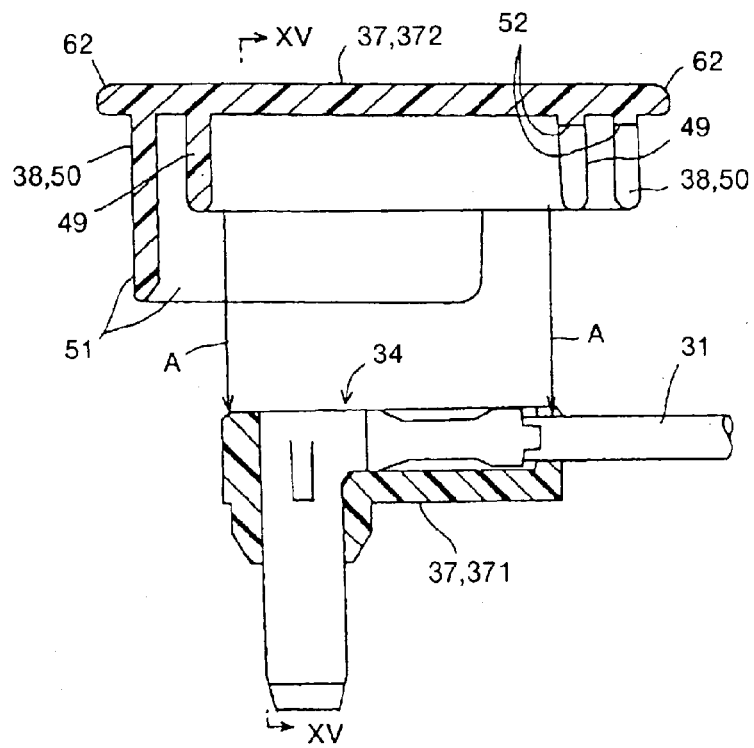
FIG. 14 is a sectional view of a state before the connector holder holding the male terminal is covered with a connector cover taken along a ling VI—VI in FIG. 5.
Figure 15:
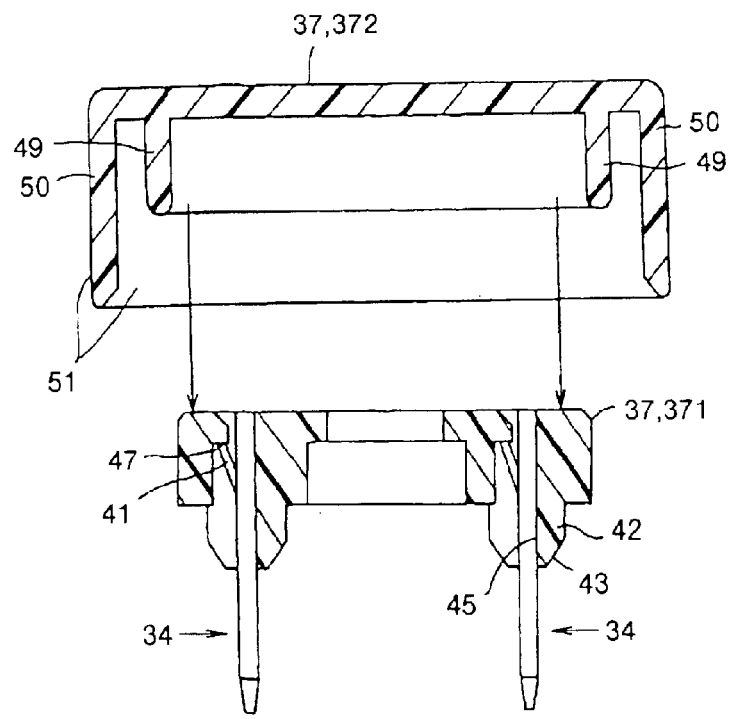
FIG. 15 is a sectional view taken along a line XV—XV in FIG. 14.
Figure 16:
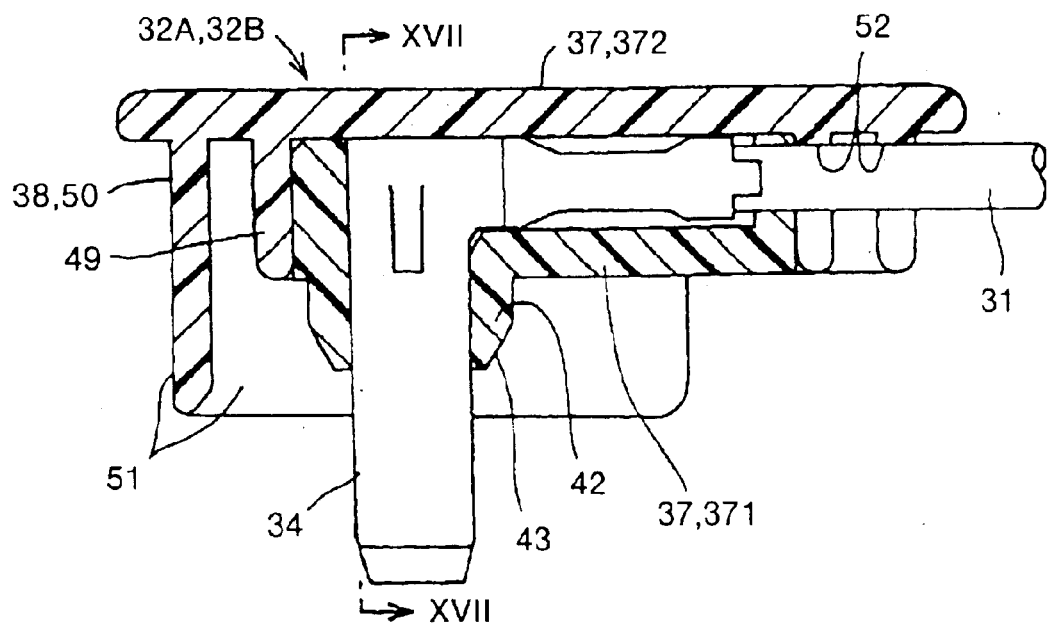
FIG. 16 is a sectional view of a state in which the male terminal is held by a male holder taken along a line VI—VI in FIG. 5.
Figure 17:
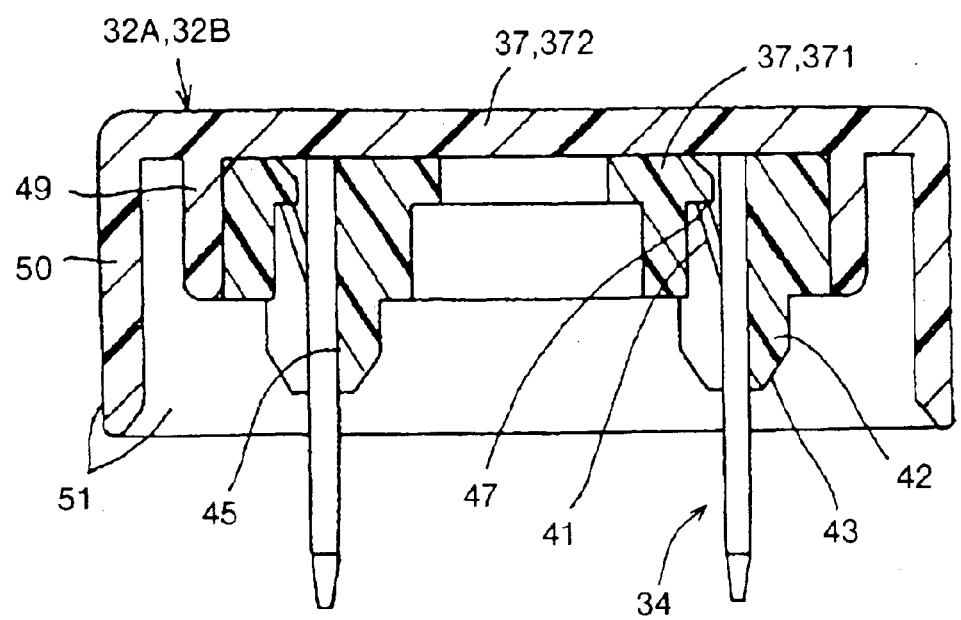
FIG. 17 is a sectional view taken along a line XVII—XVII in FIG. 16.
Figure 18:
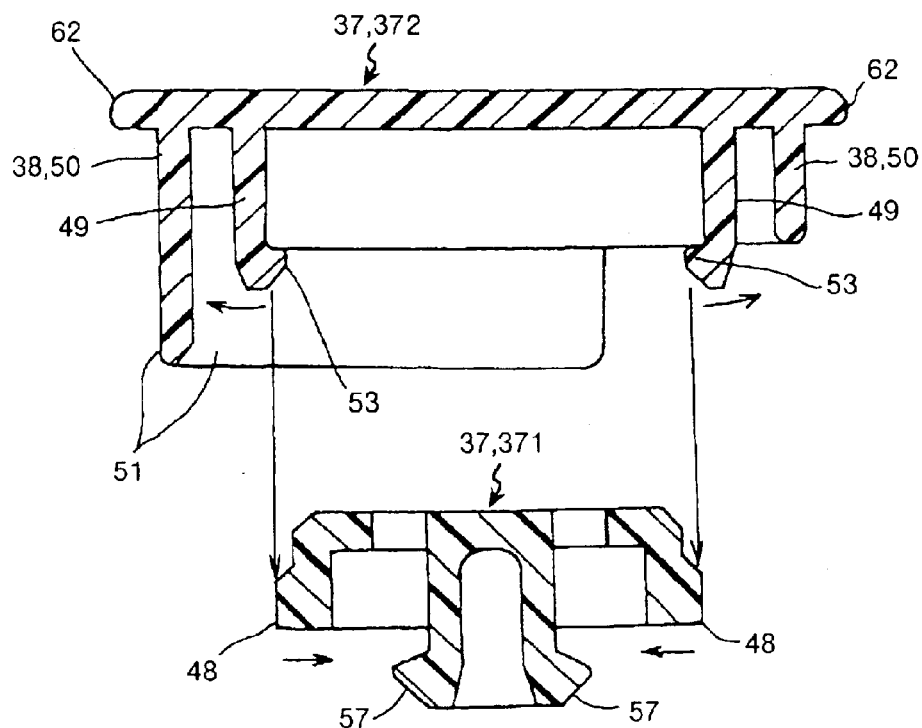
FIG. 18 is a sectional view of a state before the connector holder is covered with the connector cover taken along a line X—X in FIG. 5.
Figure 19:
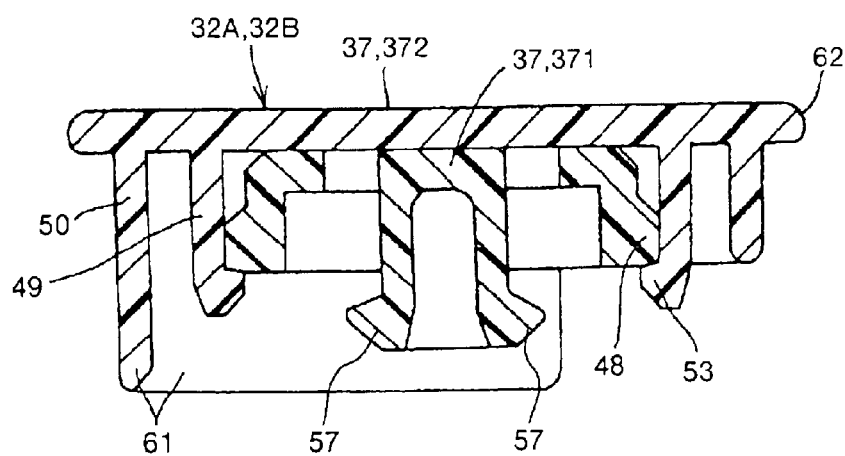
FIG. 19 is a sectional view of a state in which the connector holder is covered with the connector cover taken along the line X—X in FIG. 5.
Figure 20:
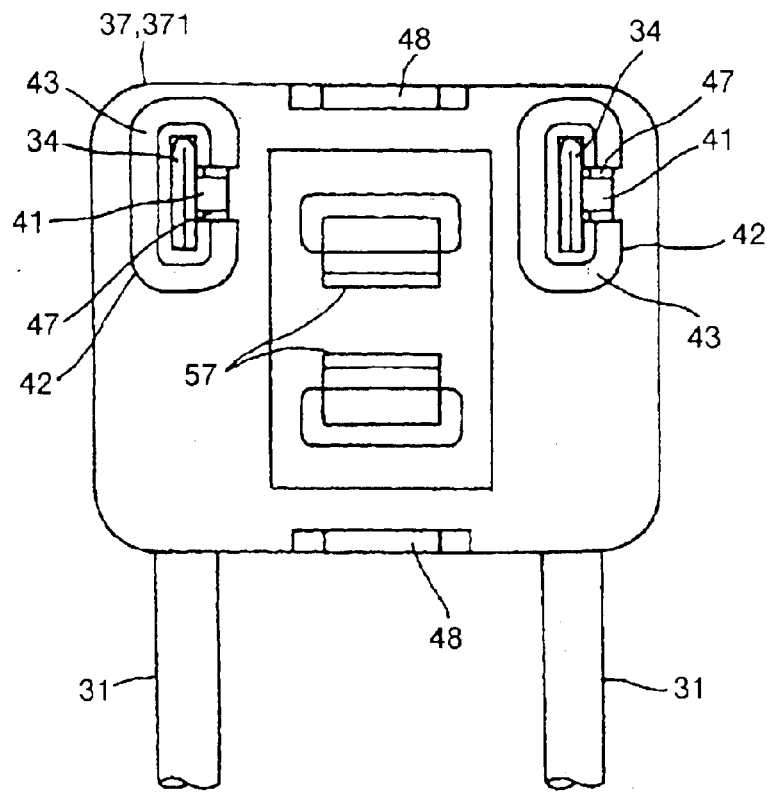
FIG. 20 is a front view of a state in which the male terminal is temporarily held by the connector holder taken along an arrow XX in FIG. 5.
Figure 21:
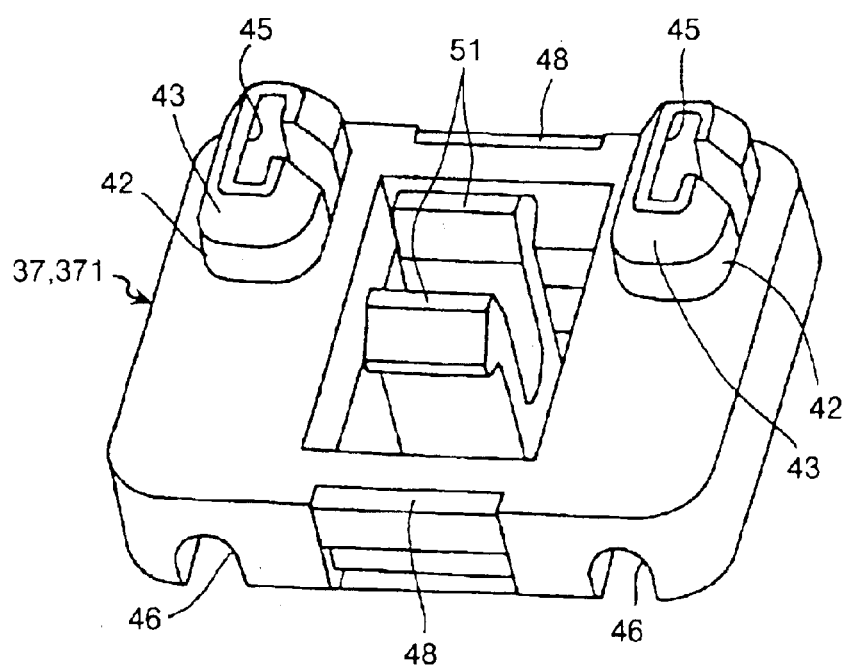
FIG. 21 is a perspective view of the connector holder taken along the arrow XX in FIG. 5.
Figure 22:
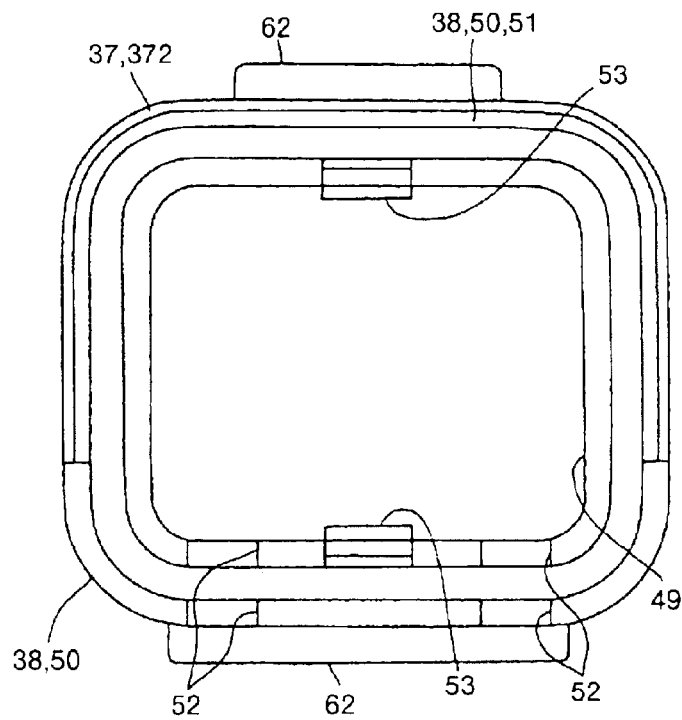
FIG. 22 is a front view of the connector cover taken along the arrow XX in FIG. 5.
Figure 23:
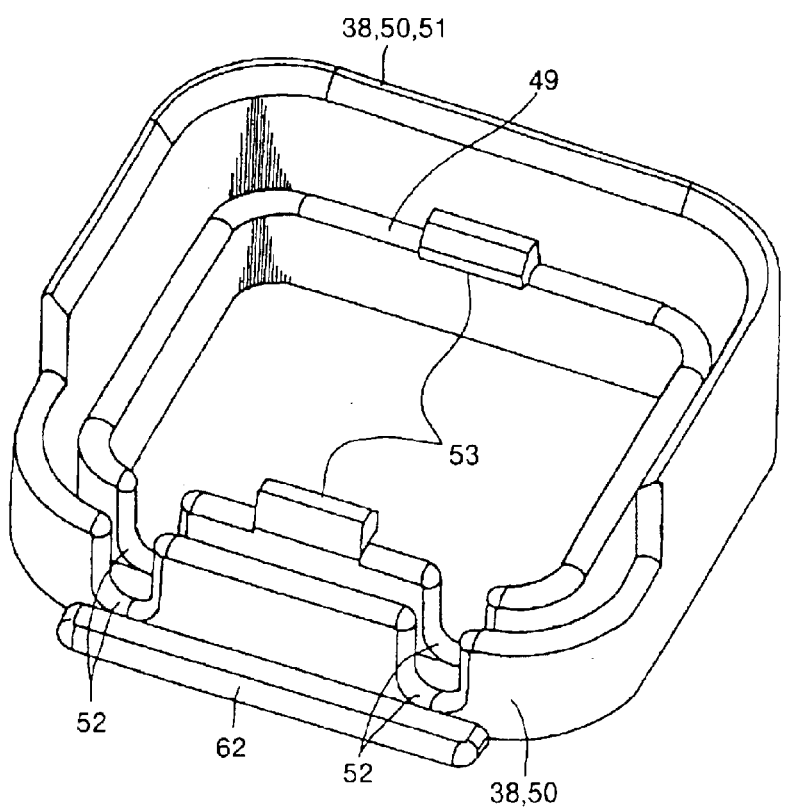
FIG. 23 is a perspective view of the connector cover taken along the arrow XX in FIG. 5.
Figure 24:
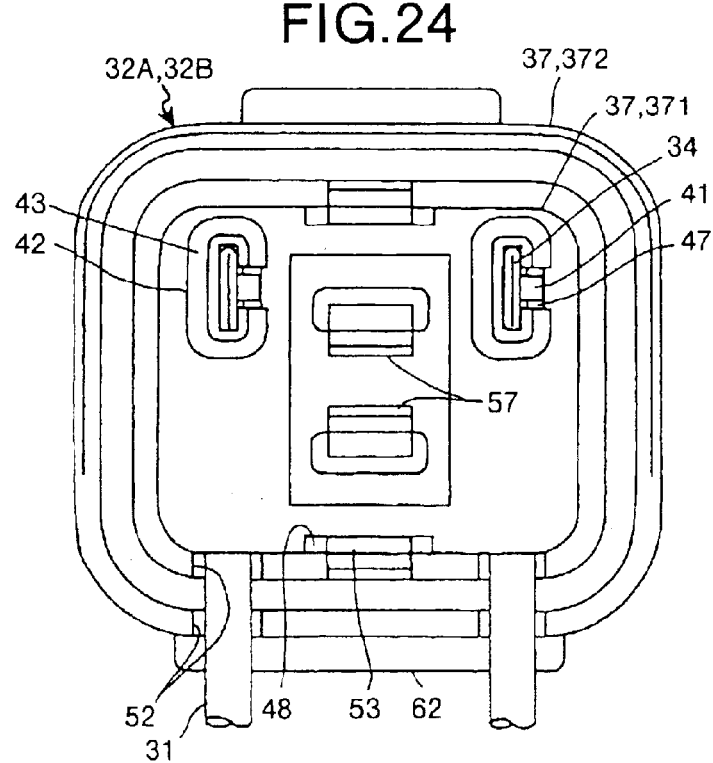
FIG. 24 is a front view of a state in which the male terminal is held by the male connector taken along the arrow XX in FIG. 5.
Figure 25:
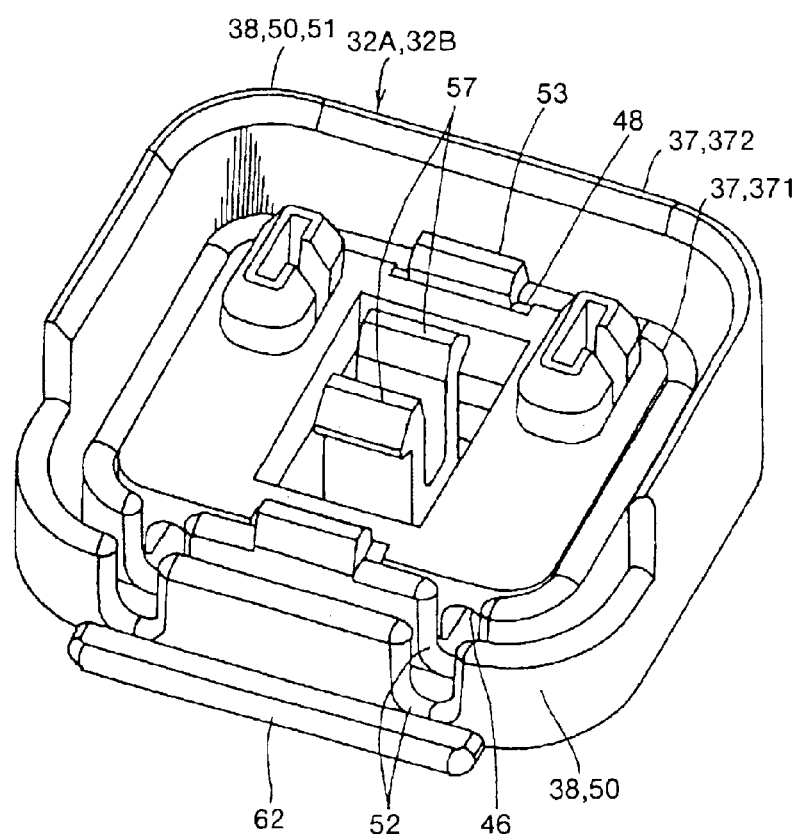
FIG. 25 is a perspective view of the male connector taken along the arrow XX in FIG. 5.

That is, as shown in FIGS. 5, 10 and 11, center portions of the lateral fitting section 36A and vertical fitting section 36B of the female holder (second housing 18) are provided with small rectangular opening 54. A rising wall 55 is integrally provided around the opening 54. The lock mechanism on the side of the female holder comprises a pair of engaging steps 56 which are integrally formed on inner surfaces of the rising wall 55 and the opening 54. On the other hand, as shown in FIGS. 10, 11, 18 and 19, the lock mechanism on the side of the male holder 37 comprises a pair of lance-like resilient engaging pawls 57 which are integrally formed on a central portion of the connector holder 371.

The male holder 37 and the female holder (second housing 18) are provided with a holding mechanism which holds the fitting state between the third fitting section 48 of the connector holder 371 and the resilient fitting section 53 of the connector cover 372 when the lock of the lock mechanism (resilient engaging pawls 57 and the engaging step 56) is released.

That is, the lateral fitting section 36A and the vertical fitting section 36B of the female holder (second housing 18) has double rising wall comprising an inner rising wall 58 and an outer rising wall 59. The double rising walls 58, 59 are respectively provided with notches 60, 60 for pulling out the harness 31. The outer rising wall 59 is taller than the inner rising wall 58. The inner rising wall 58 and the outer rising wall 59 on the side of the female holder (second housing 18) and the outer rising wall 50 on the side of the male holder 37 also function as the holding mechanism.

The resilient engaging pawls 57 and the engaging steps 56 of the lock mechanism, the double rising walls 49, 50 of the male holder 37 surrounding the male terminal 34 and the female terminal 33, and the double rising walls 58, 59 of the female holder (second housing 18) also function as waterproofing wall. The rising wall 55 surrounding the opening 54 also functions as a waterproofing wall.

The male holder 37 and the female holder (second housing 18) are provided with a guide unit which engaged with each other before the male terminal 34 is inserted into the female terminal 33 and which guide when the male terminal 34 is inserted into the female terminal 33. The guide unit comprises the guide projection 51 which is one of the tall outer rising walls 50 of the male holder 37, and a guide recess 61 which is a deep groove between the inner rising wall 58 and the outer rising wall 59 of the lateral fitting section 36A and the vertical fitting section 36B.

The guide projection 51 and the guide recess 61 as the guide unit comprise the resilient engaging pawls 57 of the lock mechanism and the engaging steps 56, the outer rising wall 50 surrounding the male terminal 34 and the female terminal 33 and portions of the double rising walls 58 and 59 and thus, the guide projection 51 and the guide recess 61 function as the waterproofing walls.

Figure 6:
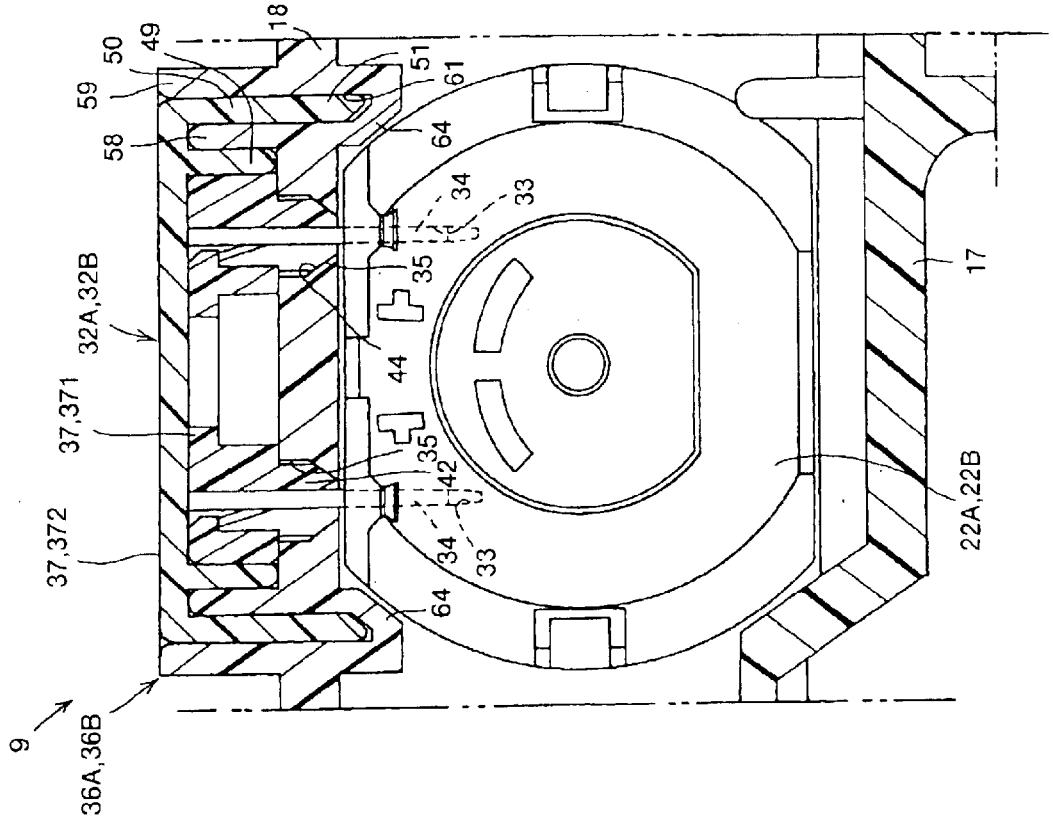
FIG. 6 is a sectional view of a state in which a female connector and a male connector are connected to each other taken along a line VI—VI in FIG. 5.

As shown in FIGS. 5, 6 and 8, central portions of opposite sides of the outer rising wall 50 on the side of the male holder 37 and central portions of opposite sides of the outer rising wall 59 on the side of the female holder (second housing 18) are respectively provided with a fitting projection 62 and a fitting recess 63 which are fitted to each other.

Figure 7:
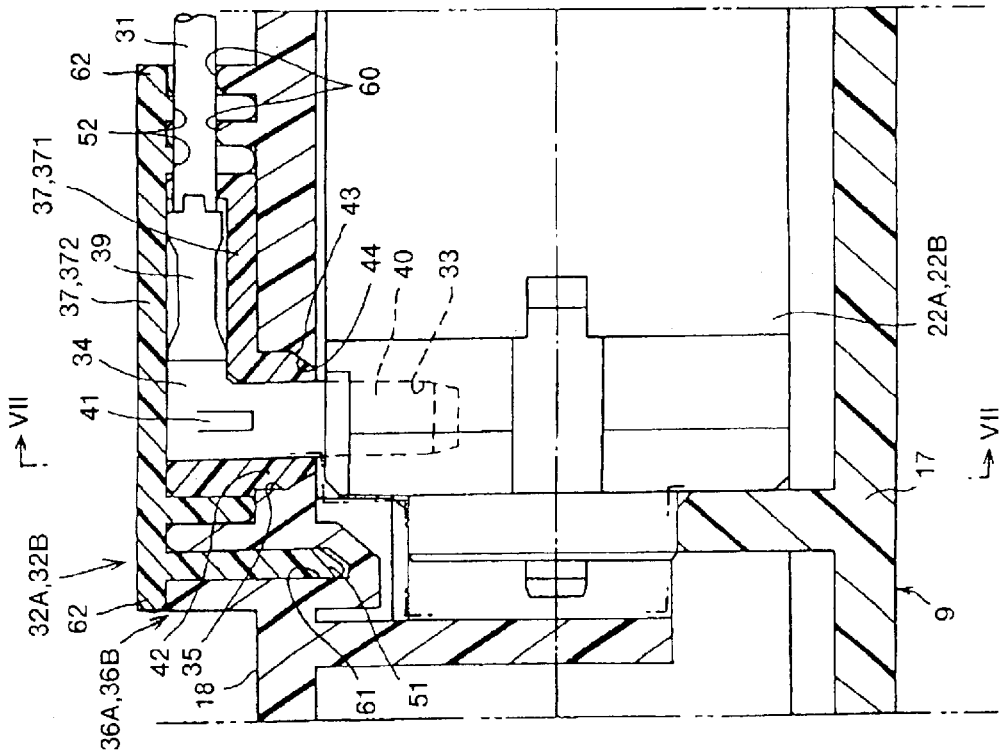
FIG. 7 is a sectional view taken along a line VII—VII in FIG. 6.

As shown in FIGS. 3B, 7 and 9, an inner side of the second housing 18 is integrally provided with a positioning projection 64 for laterally positioning the lateral worm 24A and the vertical worm 24B of the lateral motor 22A and the vertical motor 22B with respect to the axial direction. The positioning projection 64 is provided in correspondence with a bottom of a groove between the inner rising wall 58 and the outer rising wall 59.

The connector in this embodiment has the above-described structure, and operation thereof will be explained below.

As shown in FIG. 5, the first fitting sections 38 of the male holders 37 of the lateral male connector 32A and the vertical male connector 32B are fitted to the lateral fitting section 36A and the vertical fitting section 36B of the female holder (second housing 18) of the female connector (power unit 9) in the direction of the arrow A.

As shown in FIGS. 8 and 9, the guide projection 51 and the guide recess 61 are engaged with each other. At the same time, the terminal connecting section 40 of the male terminal 34 is inserted into the insertion hole 35 of the female holder (second housing 18).

As shown in FIGS. 6 and 7, the terminal connecting section 40 of the male terminal 34 is directly inserted into the female terminal 33 of the lateral motor 22A and the vertical motor 22B while being guided by the guide action of the mutual engagement between the guide projection 51 and the guide recess 61. At the same time, the second fitting section 42 of the male holder 37 is fitted into the insertion hole 35 of the female holder (second housing 18). A tape surface 43 of the second fitting section 42 and a taper surface 44 of the insertion hole 35 are fitted to each other similarly.

On the other hand, as shown in FIGS. 10 and 11, the resilient engaging pawls 57 of the lock mechanism is once bent and resiliently restored and resiliently engaged with the engaging steps 56.

With this, as shown in FIGS. 6, 7 and 10, the first fitting sections 38 of the male holders 37 of the lateral male connector 32A and the vertical male connector 32B, and the lateral fitting section 36A and the vertical fitting section 36B of the female holder (second housing 18) of the female connector (power unit 9) are fitted to each other. At that time, the fitting projection 62 on the side of the male holder 37 and the fitting recess 63 on the side of the female holder (second housing 18) are fitted to each other.

That is, the double rising walls 49, 50 on the side of the male holder 37 and the double rising walls 58, 59 on the side of the female holder (second housing 18) are alternately fitted to each other. The harness 31 is pulled out through the notch 52 on the side of the male holder 37 and the notch 60 on the side of the female holder (second housing 18). The male terminal 34 and the female terminal 33 are electrically connected to each other. As a result, electricity can be fed to the lateral motor 22A and the vertical motor 22B.

If electricity is fed to the lateral opening 20A or the vertical opening 20B by remote control from the driver's seat of the automobile, the mirror unit 10 is laterally or vertically tilted with respect to the power unit 9.

The first fitting sections 38, of the male holders 37 of the lateral male connector 32A and the vertical male connector 32B are pulled out in a direction opposite from the arrow A from the lateral fitting section 36A and the vertical fitting section 36B of the female holder (second housing 18) of the female connector (power unit 9). As a result, as shown in FIG. 11, the resilient engaging pawls 57 of the lock mechanism is bent and the resilient engagement with respect to the engaging steps 56 is released. With this, the first fitting sections 38, of the male holders 37 of the lateral male connector 32A and the vertical male connector 32B can be pulled out from the lateral fitting section 36A and the vertical fitting section 36B of the female holder (second housing 18) of the female connector (power unit 9). When they are pulled out, a tool (not shown) is hung on the fitting projection 62 on the side of the male holder 37 for pulling out.

The connector in this embodiment has the above-described structure, and the following effect can be achieved.

That is, in the connector of this embodiment, a portion of the terminal connecting section 40 of the male terminal 34 located in the insertion hole 35 from the root portion with respect to the male holder 37 (connector holder 371) is covered with the second fitting section 42. With this, a portion of the terminal connecting section 40 of the male holder 37 that is exposed is extremely small as compared with the conventional connector, and water or dust is less prone to attach. Therefore, it is extremely rare that water or dust attached to the exposed portion of the male terminal 34 enters a connecting portion between the male terminal 34 and female terminal 34, which is electrically preferable. The connector of this embodiment has excellent waterproofing effect and dustproofing effect.

According to the connector in this embodiment, since the second fitting section 42 is fitted into the insertion hole 35, it is possible to reliably insert the male terminal 34 into the female terminal 33 without rattling by fitting the second fitting section 42 into the insertion hole 35. Therefore, it is possible to reliably connect the male terminal 34 and the female terminal 33 electrically.

According to the connector of this embodiment, the outer surface of the second fitting section 42 and the inner surface of the insertion hole 35 are formed with the taper surfaces 43 and 44 whose widths are reduced in the inserting direction A of the terminal connecting section 40 of the projection of the male terminal 34. As a result, according to the connector of this embodiment, the second fitting section 42 can be fitted into the insertion hole 35 more reliably. Therefore, the male terminal 34 can be reliably inserted into the female terminal 33 without rattling and they can be connected to each other electrically. Further, it is possible to reliably prevent water and dust from entering into the female holder (second housing 18) because the second fitting section 42 and the insertion hole 35 are strongly fitted to each other, and the waterproofing effect and the dustproofing effect can further be enhanced.

In the connector of this embodiment, the insertion hole 35 also functions as an insertion hole for inserting a test terminal (not shown) for carrying out a test of the electrical apparatus (lateral motor 22A, vertical motor 22B) on the side of the female connector (power unit 9). As a result, according to the connector of this embodiment, the number of insertion holes 35 provided on the female holder (second housing 18) can be reduced. Correspondingly, the waterproofing effect and the dustproofing effect can further be enhanced.

According to the connector of this embodiment, the male terminal 34 is temporarily held by the connector holder 371 and then, the male terminal 34 is finally held by the connector holder 371 and the connector cover 372. Therefore, it is possible to reliably hold and assemble the male terminal 34 and the male holder 37, and the holding and assembling operation of the male terminal 34 and the male holder 37 is stabilized.

According to the connector of this embodiment, the male holder 37 and the female holder (second housing 18) are respectively provided with the resilient engaging pawls 57 and the engaging steps 56 as the lock mechanisms. There are also provided holding mechanisms (the inner rising wall 58 and the outer rising wall 59 on the side of the female holder (second housing 18) and the outer rising wall 50 on the side of the male holder 37) for holding the fitting state between the third fitting section 48 of the connector holder 371 and the resilient fitting section 53 of the connector cover 372 at the time of releasing of lock.

As a result, according to the connector of this embodiment, when the locked state between the male holder 37 and the female holder (second housing 18) is released, the connector holder 371 of the male holder 37 and the connector cover 372 are not separated irrespective of the fact that the male holder 37 comprises the separate connector holder 371 and connector cover 372.

That is, as shown in FIG. 7, the third fitting section 48 of the connector cover 372 and the resilient fitting section 53 of the connector cover 372 which are mutually resiliently fitted to each other are surrounded by the holding mechanism (the inner rising wall 58 and the outer rising wall 59 on the side of the female holder (second housing 18) and the outer rising wall 50). Therefore, when the resilient engaging pawls 57 which is the lock mechanism is bent and separated from the engaging steps 56, even if the resilient fitting section 53 tries to spread outward, the resilient fitting section 53 is suppressed from spreading outward by the holding mechanism.

Therefore, it is possible to reliably pull the male holder 37 out from the female holder (second housing 18). Further, when the male holder 37 is pulled out from the female holder (second housing 18), since the connector holder 371 and the connector cover 372 of the male holder 37 are not easily separated, quality of the connector holder 371 and the connector cover 372 of the male holder 37 is stabilized.

According to the connector of this embodiment, the waterproofing walls (the double rising walls 49, 50 on the side of the male holder 37, and the double rising walls 58, 59 and the rising wall 55 on the side of the female holder (second housing 18) are provided around the resilient engaging pawls 57 and the engaging steps 56 as the lock mechanisms. With this, the waterproofing effect is exhibited in the resilient engaging pawls 57 and the engaging steps 56 of the lock mechanisms irrespective of the fact that the male holder 37 and the female holder (second housing 18) are provided with the resilient engaging pawls 57 and the engaging steps 56 as the lock mechanisms.

According to the connector of this embodiment, the waterproofing walls (the double rising walls 47, 48 on the side of the male holder 37 and the double rising walls 58, 59 and the rising wall 55 on the side of the female holder (second housing 18) are provided around the male terminal 34 and the female terminal 33. With this waterproofing effect is exhibited with respect to the male terminal 34 and the female terminal 33.

According to the connector of this embodiment, when the male terminal 34 is inserted into the female terminal 33, the guide projection 51 and the guide recess 61 as the guide unit guide. With this, according to the connector of this embodiment, loads to the male terminal 34 and the female terminal 33 can be reduced, and it is possible to prevent the male terminal 34 and the female terminal 33 from being damaged.

According to the connector of this embodiment, one member functions as both the waterproofing wall and the guide unit. That is, the outer rising wall 50 on the side of the male holder 37 functions as the waterproofing wall and the guide projection 51. The inner rising wall 58 and the outer rising wall 59 on the side of the female holder (second housing 18) form the waterproofing wall, and the groove therebetween functions as the guide recess 61. With this, the structure is simplified.

Especially, according to the connector of this embodiment, the harness 31 is pulled out through the notches 52 of the double rising walls 49, 50 on the side of the male holder 37 and the notches 60 of the double rising walls 58, 59 on the side of the female holder (second housing 18). As a result, according to the connector of this embodiment, there is waterproofing effect for a portion of the harness 31 pulled out from the male holder 37 and the female holder (second housing 18).

According to the connector of this embodiment, the positioning projection 64 is provided inside the second housing 18. Therefore, according to the connector of this embodiment, the lateral motor 22A and the vertical motor 22B can be position with respect to the axial directions of the lateral worm 24A and the vertical worm 24B without rattling in the lateral direction.

The lateral worm 24A and vertical worm 24B and the lateral helical gear 25A and the vertical helical gear 25B are meshed each other, so that the lateral motor 22A and the vertical motor 22B suppress the rattling of the lateral worm 24A and the vertical worm 24B in the axial direction.

The positioning projection 64 is provided in correspondence with the bottom of the groove between the inner rising wall 58 and the outer rising wall 59 on the side of the female holder (second housing 18). Therefore, the structure is simple.

According to the connector of this embodiment, since the center axis 02—02 of the harness connecting section 39 and the center axis 01—01 of the terminal connecting section 40 substantially coincide with each other as shown in FIG. 26A, the male terminal 34 can be reduced in size.

That is, as shown in FIG. 26C, in the case of the male terminal 340 in which the center axis 02—02 of the harness connecting section 39 and the center axis 01—01 of the terminal connecting section 40 do not coincide with each other, there is a deviation amount w1 between the center axis 02—02 of the harness connecting section 39 and the center axis 01—01 of the terminal connecting section 40. Therefore, a back surface of the falling-out preventing section 41 projects outward from a back surface of the harness connecting section 39. Whereas, in the case of the male terminal 34 of the connector of this embodiment, a deviation amount between the center axis 02—02 of the harness connecting section 39 and the center axis 01—01 of the terminal connecting section 40 is almost zero. Thus, the back surface of the falling-out preventing section 41 and the back surface of the harness connecting section 39 are flush with each other. With this design, the male terminal 34 of the connector of this embodiment is smaller in size as compared with the conventional male terminal 340.

Figure 27B:
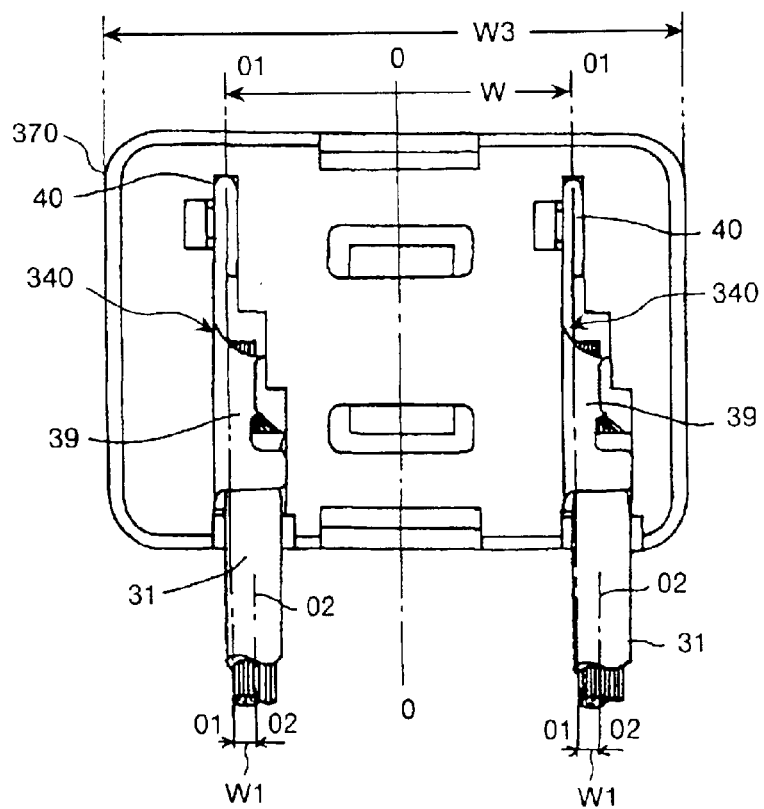
FIG. 27B is a rear view of a state in which a male terminal having no crank section is temporarily held by the connector holder taken along an arrow XXVII in FIG. 5.

As shown in FIGS. 27A and 27B, in the connector having the three conditions (connector having the condition that the distance w between the center axes 01—01 of the terminal connecting sections 40 of the two male terminals 34 are set to predetermined size, the condition that the center axes 01—01 of the terminal connecting sections 40 of the two male terminals 34 are disposed symmetric with respect to the center axes 0—0 of the male holders 37 of the two male terminals 34, and the condition that the outward appearances of the male holders 37, 370 have symmetric shapes with respect to the axis 0—0 in terms of waterproofing structure), the male holder 37 for holding the male terminal 34 of the connector of this embodiment can be reduced in size as compared with the insulative male holder 370 holding the male terminal 340.

That is, as shown in FIG. 26C, the male terminal 340 has the deviation amount W1 between the center axis 02—02 of the harness connecting section 39 and the center axis 01—01 of the terminal connecting section 40. Whereas, in the case of the male terminal 34 of the connector of this embodiment, as shown in FIG. 26A, the deviation amount between the center axis 02—02 of the harness connecting section 39 and the center axis 01—01 of the terminal connecting section 40 is almost zero. With this design, a width W2 of the male holder 37 holding the two male terminals 34 of the connector of this embodiment is smaller than a width W3 of the male holder 370 holding the two male terminals 340 by two times.

The two male terminals 34 of the connector of this embodiment may be common in structure.

That is, if the right male terminal 340 out of the two male terminals 340 is disposed in opposite direction in the lateral direction, the width W3 of the male holder 370 holding the two male terminals 340 can be reduced as small as the width W2 of the male holder 37 holding the two male terminals 34 of the connector of this embodiment.

In this case, however, a left male terminal disposed on the left side of the male holder and a right male terminal disposed on the right side of the male holder are required.

According to the connector of this embodiment, since the center axis 02—02 of the harness connecting section 39 and the center axis 01—01 of the terminal connecting section 40 substantially coincide with each other, the male terminals 34 to which the harness 31 is connected can be common in structure.

Since the two male terminals 34 can be common, the number of parts can be reduced by half, and it is easy to manage the parts as compared with a structure requiring the left male terminal and the right male terminal. The male holder 37 holding the two male terminals 34 to which the harnesses 31 are connected is reduced in size. Thus, the housings 17, 18 of the power unit 9 as the female holder to which the male holder 37 is fitted can also be reduced in size. Further, freedom in design of positions where the male terminal 37 is fitted to the housings 17 and 18 of the power unit 9 is increased.

This embodiment is applied to the power unit 9 of the remote control mirror apparatus for automobile, i.e., to the two piece type connector. However, the connector of this invention can also be applied to a one-piece type connector or a three or more piece type of connector in addition to the power unit 9 of the remote control mirror apparatus for automobile.

In this embodiment, the male terminal 34 is provided with the crank section 341. However, the connector of the present invention can also be applied to a connector in which a female terminal to which a harness is connected is provided with the crank section.

Figure 28:
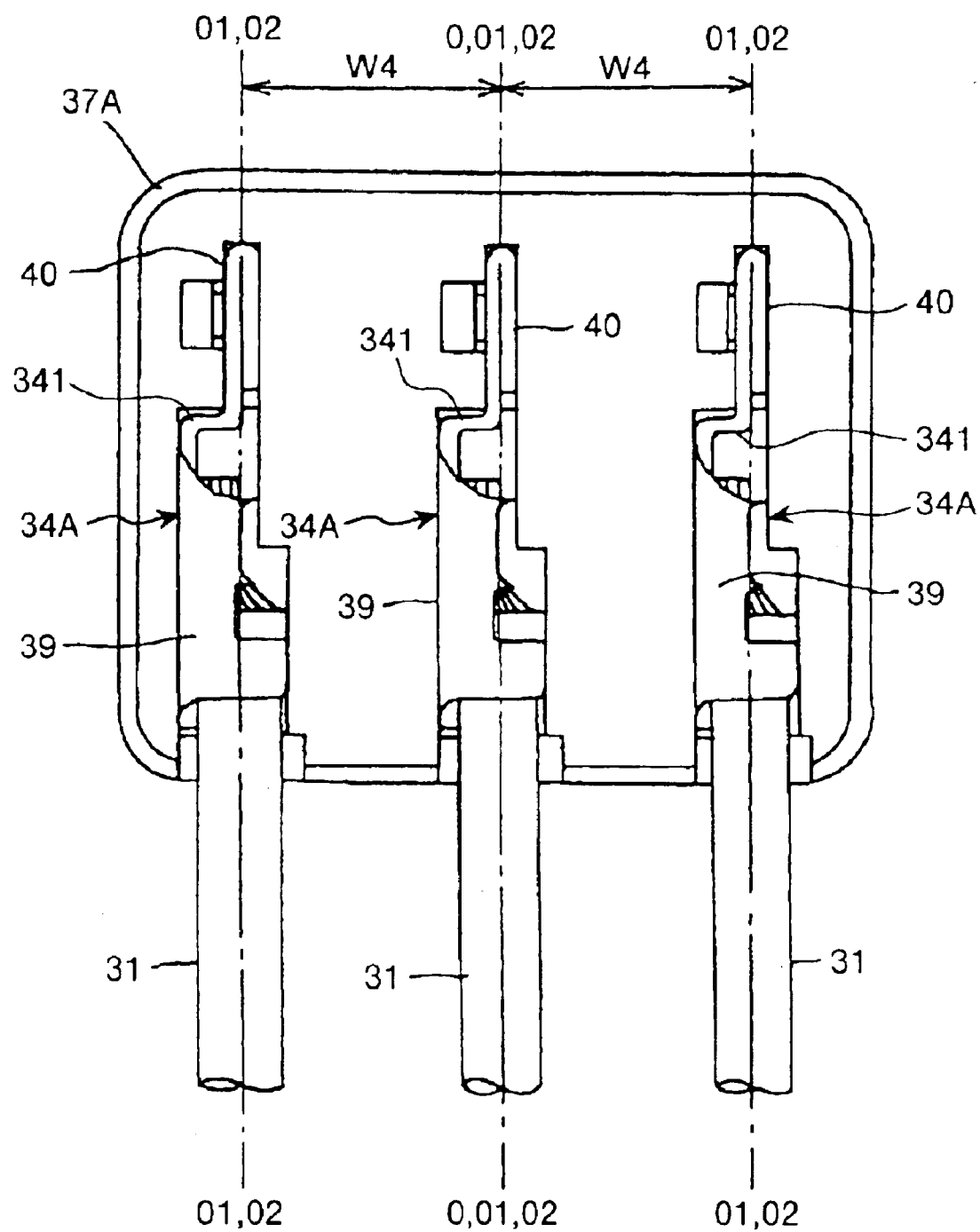
FIG. 28 is a rear view of a state in which three male terminals are temporarily held by the connector holder taken along the arrow XXVII in FIG. 5.

In this embodiment, the example in which the two male terminals 34 are held by the male holder 37 is explained. However, in this invention, one male terminal or three or more male terminals may be held by the male holder. For example, as shown in FIG. 28, three male terminals 34A, 34A and 34A may be disposed and held by the male holder 37A equally (at distances W4).

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

This application claims priority from Japanese Patent Application Serial No. 2001-222236, filed Jul. 23, 2001, and Japanese Patent Application Serial No. 2001-222237, filed Jul. 23, 2001, which are incorporated herein by reference in their entirety.

What is claimed is:

1. A connector for connecting electric conductors to each other, the connector comprising a female connector and a male connector, the female connector including a female terminal having a terminal connecting section and an insulative female holder which holds the female terminal in a state in which the terminal connecting section is accommodated therein and which has an insertion hole, the male connector including a male terminal having a terminal connecting section which is inserted into the insertion hole and which is connected to the terminal connecting section of the female terminal, an insulative male holder for holding the male terminal in a state in which the terminal connecting section is projected outward, and a fall out preventing section configured to prevent the male terminal from falling out from the male holder, wherein a root portion of the terminal connecting section of one of the male terminals that projects outward is provided with a fitting section to be fitted into the insertion hole, wherein any one or both of the male terminal and the female terminal includes a harness connecting section to which a harness is connected and a terminal connecting section that connects to the other terminal, a center axis of the harness connecting section and a center axis of the terminal connecting section substantially coinciding with each other, and a surface of the harness connecting section and a surface of the fall out preventing section substantially flush with one another.

2. The connector according to claim 1, wherein an outer surface of the fitting section and an inner surface of the insertion hole are formed with a taper surface whose width is reduced toward the inserting direction.

3. The connector according to claim 1, wherein the female terminal is connected to an electrical apparatus, and the insertion hole also functions as an insertion hole into which a test terminal for carrying out the electrical apparatus is inserted.

4. A connector for connecting electric conductors to each other, the connector comprising a female connector and a male connector, the female connector including a female terminal having a terminal connecting section and an insulative female holder which holds the female terminal in a state in which the terminal connecting section is accommodated therein and which has an insertion hole, the male connector including a male terminal having a terminal connecting section which is inserted into the insertion hole and which is connected to the terminal connecting section of the female terminal, a connector holder as an insulative male holder which temporarily holds the male terminal in a state in which the male terminal is inserted in the inserting direction and the terminal connecting section is projected outward, and a connector cover as an insulative male holder which is fitted to the connector holder in the inserting direction to cover the connector holder and which finally holds the male terminal and the connector holder, wherein the male holder and the female holder are respectively provided with a lock mechanism for detachably locking the male holder and the female holder, and a holding mechanism for holding a fitting state between the connector holder and the connector cover when the lock of the lock mechanism is released.

5. The connector according to claim 4, wherein any one or both of the male terminal and the female terminal includes a harness connecting section to which a harness is connected and a terminal connecting section connected to the other terminal, a center axis of the harness connecting section and a center axis of the terminal connecting section substantially coinciding with each other.

6. A connector for connecting electric conductors to each other, the connector comprising a female connector and a male connector, the female connector including a female terminal having a terminal connecting section and an insulative female holder holding the female terminal, the male connector including a male terminal having a terminal connecting section which is connected to the terminal connecting section of the female terminal, and an insulative male holder holding the male terminal, wherein a central portion of the male holder and a central portion of the female holder are provided with lock mechanisms for detachably locking the male holder and the female holder wherein the lock mechanism comprises engaging steps on the female connector and resilient engaging paws on the male connector.

7. A connector for connecting electric conductors to each other, the connector comprising a female connector and a male connector, the female connector including a female terminal having a terminal connecting section and an insulative female holder holding the female terminal, the male connector including a male terminal having a terminal connecting section which is connected to the terminal connecting section of the female terminal, and an insulative male holder holding the male terminal, wherein a central portion of the male holder and a central portion of the female holder are provided with lock mechanisms for detachably locking the male holder and the female holder, wherein waterproofing walls for surrounding the lock mechanisms are provided around the male holder and the female holder.

8. The connector according to claim 7, wherein the waterproofing walls are mutually engaged with each other before the terminal connecting section of the male terminal is connected to the terminal connecting section of the female terminal, and the waterproofing walls also function as a guide unit which guides when the terminal connecting section of the male terminal is connected to the terminal connecting section of the female terminal.

9. The connector according to claim 6, wherein any one or both of the male terminal and the female terminal includes a harness connecting section to which a harness is connected and a terminal connecting section that connects to the other terminal, a center axis of the harness connecting section and a center axis of the terminal connecting section substantially coinciding with each other.

10. A connector for connecting electric conductors to each other, the connector comprising a female connector and a male connector, the female connector including a female terminal having a terminal connecting section and an insulative female holder holding the female terminal, the male connector including a male terminal having a terminal connecting section which is connected to the terminal connecting section of the female terminal, and an insulative male holder holding the male terminal, wherein the male holder and the female holder are provided with a guide unit where portions of the guide unit are mutually engaged with each other before the terminal connecting section of the male terminal is connected to the terminal connecting section of the female terminal, and the guide unit guides when the terminal connecting section of the male terminal is connected to the terminal connecting section of the female terminal, wherein the guide unit comprises a guide projection and a guide recess, the guide recess formed between two recess rising walls, the guide projection inserted into the guide recess.

11. The connector according to claim 10, wherein the guide unit also functions as a waterproofing wall which surrounds the male terminal and the female terminal.

12. The connector according to claim 10, wherein any one or both of the male terminal and the female terminal includes a harness connecting section to which a harness is connected and a terminal connecting section that connects to the other terminal, a center axis of the harness connecting section and a center axis of the terminal connecting section substantially coinciding with each other.

13. A male connector connected to a female connector for connecting electric conductors to each other, comprising:

a male terminal having a terminal connecting section which is inserted into a female terminal of the female connector and connected thereto, a connector holder as an insulative male holder for temporarily holding the male terminal in a state in which the male terminal is inserted into the inserting direction and the terminal connecting section is projected outward, and a connector cover as an insulative male holder which is fitted to the connector holder in the inserting direction for covering the connector holder and which finally holds the male terminal together with the connector holder, wherein the male holder is provided with a lock mechanism which detachably locks the male holder and the female holder of the female connector, and a holding mechanism for holding a fitting state between the connector holder and the connector cover when the lock of the lock mechanism is released.

14. The male connector according to claim 13, wherein any one or both of the male terminal and the female terminal includes a harness connecting section to which a harness is connected and a terminal connecting section that connects to the other terminal, a center axis of the harness connecting section and a center axis of the terminal connecting section substantially coinciding with each other.

15. A connector for connecting electric conductors to each other, the connector comprising:

a terminal having a harness connecting section to which a harness is connected and a terminal connecting section that connects to the other terminal, an insulative holder for holding the terminal, and a fall out preventing section configured to prevent the terminal from falling out from the insulative holder, wherein a center axis of the harness connecting section and a center axis of the terminal connecting section substantially coincide with each other so that a surface of the harness connecting section and a surface of the fall out preventing section are substantially flush with one another.

16. The connector according to claim 15, wherein a distance between center axes of terminal connecting sections of the plurality of terminals is set to a predetermined size, the center axes of the terminal connecting sections of the terminals are disposed symmetrically or equally with respect to a center axis of the holder, and an outward appearance is symmetric with respect to the center axis.

* * * * *